(12) United States Patent
Kariniemi

(10) Patent No.: US 10,766,534 B2
(45) Date of Patent: Sep. 8, 2020

(54) FRONT A-ARMS FOR A VEHICLE

(71) Applicant: Stephen Kariniemi, Scottsdale, AZ (US)

(72) Inventor: Stephen Kariniemi, Scottsdale, AZ (US)

(73) Assignee: Stephen Kariniemi, Scottsdale, AZ (US)

(*) Notice: Subject to any disclaimer, the term of this patent is extended or adjusted under 35 U.S.C. 154(b) by 164 days.

(21) Appl. No.: 16/026,314

(22) Filed: Jul. 3, 2018

(65) Prior Publication Data

US 2020/0010119 A1    Jan. 9, 2020

(51) Int. Cl.
*B62D 21/11* (2006.01)
*B62D 23/00* (2006.01)
*B60G 3/28* (2006.01)

(52) U.S. Cl.
CPC ............ *B62D 21/11* (2013.01); *B60G 3/28* (2013.01); *B62D 23/005* (2013.01); *B60G 2200/315* (2013.01); *B60G 2300/07* (2013.01)

(58) Field of Classification Search
CPC .................... B62D 21/11; B60G 2200/315
See application file for complete search history.

(56) References Cited

U.S. PATENT DOCUMENTS

| | | | | |
|---|---|---|---|---|
| 7,380,805 | B1* | 6/2008 | Turner | B60G 3/20 280/124.13 |
| 9,694,872 | B2* | 7/2017 | Laroche | B62K 5/05 |
| 10,137,769 | B2* | 11/2018 | Kariniemi | B60K 11/06 |
| 10,525,781 | B2* | 1/2020 | Upah | B60G 7/001 |
| 10,526,045 | B2* | 1/2020 | Vezina | B62M 27/02 |
| 2007/0170683 | A1* | 7/2007 | Shimizu | B60G 3/20 280/124.135 |
| 2012/0223500 | A1* | 9/2012 | Kinsman | B60G 3/20 280/124.153 |
| 2019/0217894 | A1* | 7/2019 | Upah | B60R 19/34 |
| 2019/0225042 | A1* | 7/2019 | Upah | B60K 17/16 |

* cited by examiner

*Primary Examiner* — James A English
(74) *Attorney, Agent, or Firm* — Ryan D Kariniemi

(57) ABSTRACT

An All-Terrain Vehicle with a frame, shocks, and A-Arms. The A-Arms have an arcuate shape to accommodate a shock attached below a centerline connecting front wheel(s). The A-Arms on one end arc around the shock and attach to a spindle and on a second end attach to the frame. The arcuate shape provides additional clearance, beyond a non arcuate shaped A-Arm, when a wheel is turned.

3 Claims, 4 Drawing Sheets

FRONT A-ARMS FOR A VEHICLE

FIELD OF THE INVENTION

The present invention generally relates to 4 wheeled vehicles, and more specifically to all-terrain vehicles The present application incorporates entire contents by reference, U.S. Pat. No. 9,493,191 to Kariniemi filed Apr. 10, 2014, entitled "Arcuate Frame For A Vehicle" and U.S. application Ser. No. 15/385,837, filed Dec. 20, 2016, entitled "An Arcuate Frame For A Vehicle".

BACKGROUND OF THE INVENTION

All-terrain vehicles (hereinafter "ATV") typically have a shorter wheelbase which gives the ATV increased maneuverability over longer wheelbased ATVs such as sandrails, desert trucks, and dune buggies. The shorter wheelbase however can have shortcomings compared to a longer wheelbase, for example, a shorter wheel base can have a rougher ride due in at least part to having shocks with less travel. It remains desirable to have an ATV with increased maneuverability along with more travel.

SUMMARY OF THE INVENTION

It has been recognized that it would be advantageous to develop an ATV with increased maneuverability and increased travel. In one embodiment, an ATV has a frame (e.g., an arcuate frame according to U.S. Pat. No. 9,493,191 to Kariniemi), and shocks attached to the frame. The shocks attach to the frame and to a spindle, or tower, such that the shocks attach to the spindle below an axis line through a center of a front wheel. The front top A-Arms are arched to provide clearance around the shock. The front bottom A-Arms may be straight or arched to provide additional ground clearance.

Additional features and advantages of the invention will be apparent from the description which follows, taken in conjunction with accompanying drawings, which together illustrate, by way of example, features of the invention.

DETAILED DESCRIPTION

Figure 1:
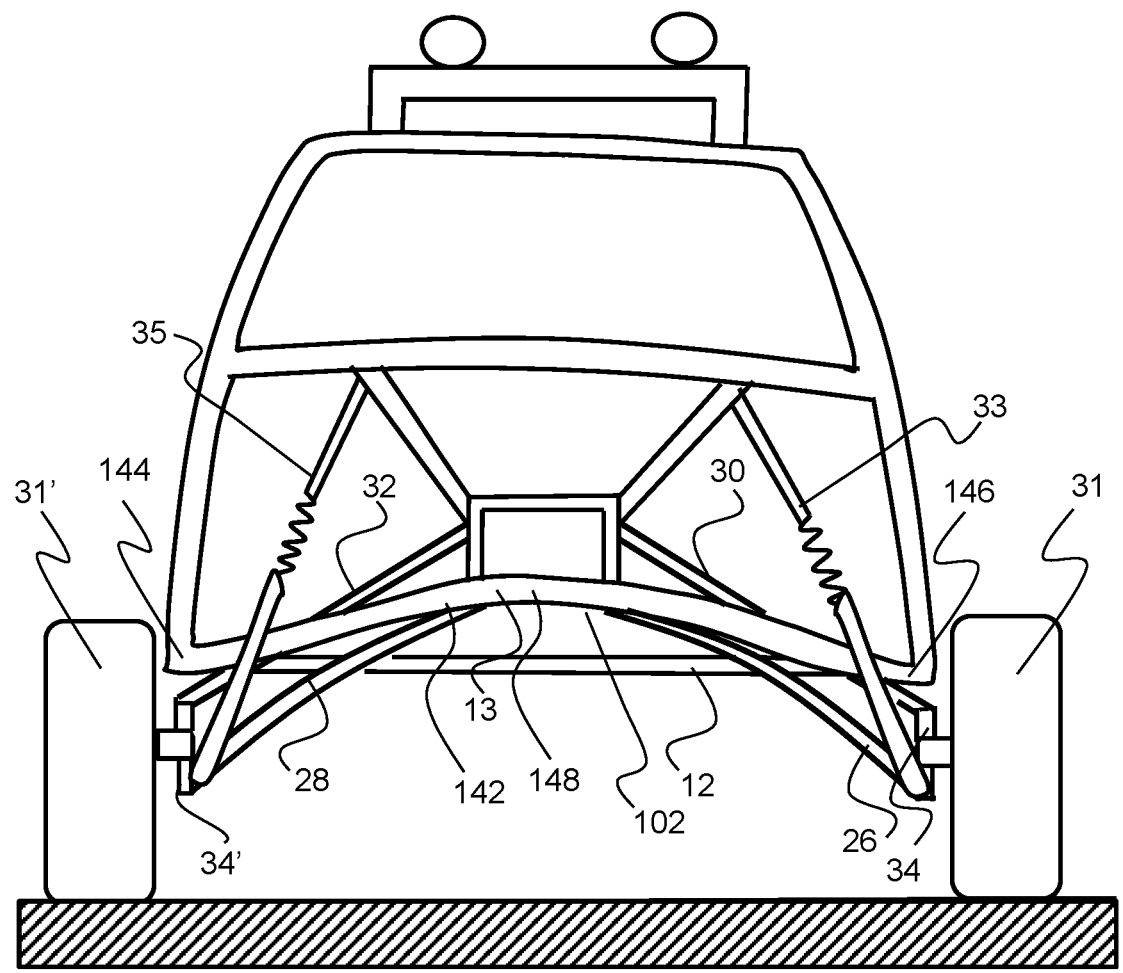
FIG. 1 shows a front (lateral) arcuate frame with A-Arms and shocks in accordance with an embodiment.

Reference will now be made to some embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

An ATV with arcuate A-Arms in accordance with various embodiments are disclosed herein and examples are illustrated in the Figures. The arcuate A-Arms may be attached to an arcuate frame. For example, the A-Arms may be constructed from a structural component or member, e.g., a truss or joist made out of a tubular-shaped steel alloy, or a steel or aluminum plate, or any rigid or semi-rigid material or cross sectional shape. For example, the top A-Arms may be made out of a plate, one for a passenger side and one for a drivers side. The plates may have a hollowed out middle section to provide clearance for a shock for example. In an alternative embodiment, the top A-Arms may be made out of individual beams or bars, for example a passenger side may have a top fore A-Arm bar and a top aft A-Arm bar and the drivers side may have a top fore A-Arm bar and a top aft A-Arm bar. The fore A-Arm and aft A-Arm may connect at same location on the frame and at a same or proximate location on the spindle. The structural component (e.g., A-Arm) may have a tubular construction typically ranging from approximately 0.5 inches to 3 inches in diameter or whatever diameter is required for adequate strength. The A-Arms can be shaped to accommodate longer shocks that are attached to a point below an axle line through a center of a front wheel. Attaching the shock to a spindle at a location below an axis line creates a need to have the front top A-Arms be arched to provide clearance around the shock.

In an embodiment, as shown in FIG. 1, the ATV may have a lateral arcuate shape 142, The frame may have a front portion that has a lateral arcuate shape 142 that may extend between the ATV front wheels or between a drivers side and a passengers side of the frame. The lateral arcuate shape 142 has a lateral arcuate shape first end 144 and a lateral arcuate shape second end 146 and a lateral arcuate shape apex 148 between the lateral arcuate shape first end 144 and lateral arcuate shape second end 146. The lateral arcuate shape may extend along entire passenger support section 18 or along only a portion of passenger support section 18.

Figure 3:
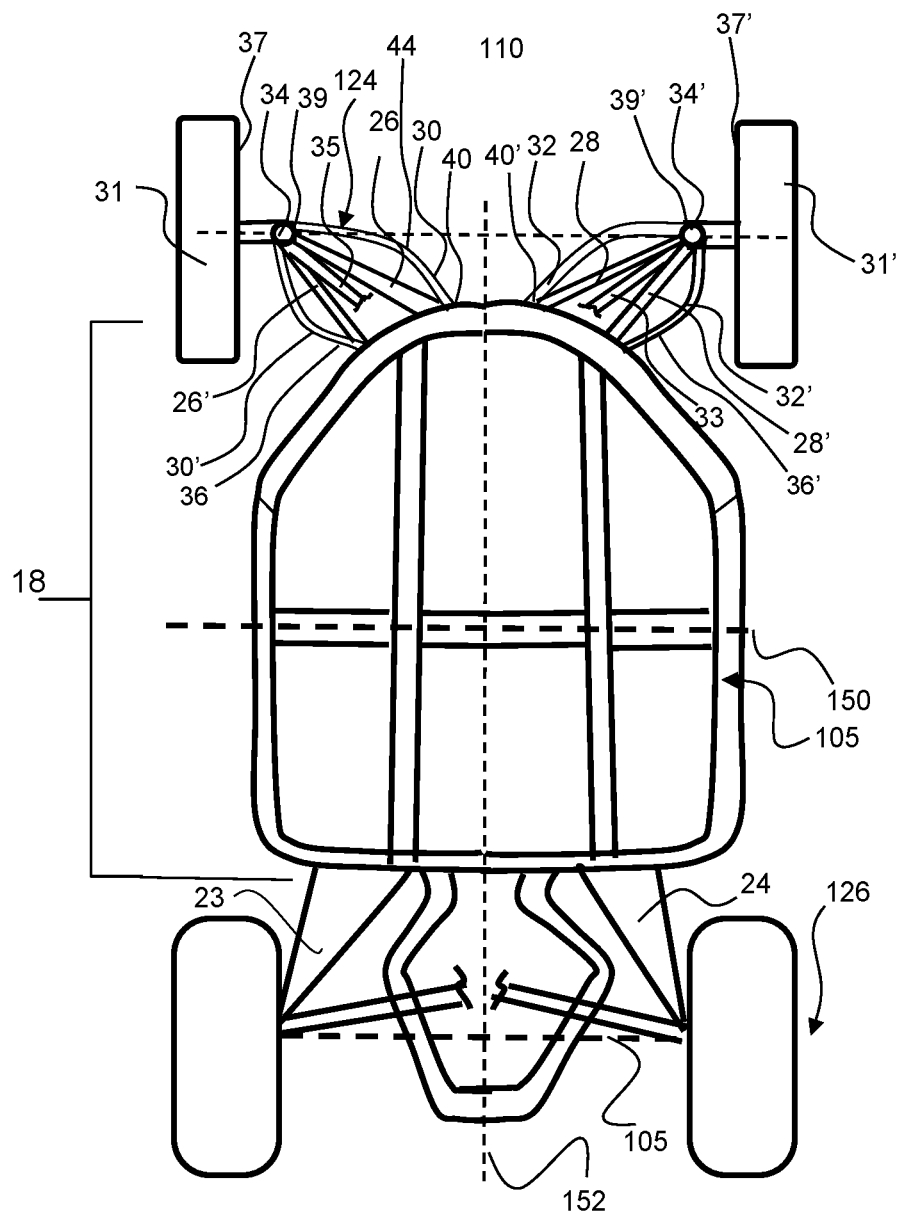
FIGS. 3 and 4 are plan views of an ATV with A-Arms in accordance with an embodiment.

In one embodiment, as shown in FIG. 1, the front bottom A-Arms 26, 28 may be arcuate or arched to provide ground clearance. The front top A-Arms 30,32 are located on each side of the ATV (e.g., passenger and drivers side). The top drivers side A-Arms 30,30' and the top passengers side A-Arms 32,32' connect to a spindle 34,34' at location 39,39', above a centerline through a wheel at a first end of the A-Arm, and at a location 40,40' to the frame at a second end of the A-Arm. The bottom passengers side A-Arm(s) 28,28' and bottom drivers side A-Arms 26, 26' connect to a spindle below a centerline through the wheel at a first end and to the frame at a second end as shown in FIG. 1. By having the shocks 33,35 attach below the centerline between front wheels 31,31', the shock is able to accommodate more travel. By placing the shock below the centerline, the top A-Arms may need to be arched (as shown in FIG. 3) so the A-Arms don't contact the shock. The bottom A-Arm(s) may be straight (non curved) when viewed from a top view (as shown in FIG. 3) and they may have a curve or arch when viewed from front view. In one embodiment the bottom A-Arm(s) 26, 26' and 28, 28' have an arch or curve upwards to provide additional ground clearance over a non curved A-Arm. The top A-Arms 30, 30' and 32, 32' from a front view (as shown in FIG. 1), may be straight, but from a top view (as shown in FIG. 3) may have an arcuate shape.

In other embodiments the lateral arcuate shape 142 may be located along other portions of the frame 105. For example, a lateral arcuate shape 142 may be located at a lateral center line 150 on the frame 105. The lateral center line 150 may be located midway between the front wheel axis 124 and the rear wheel axis 126. In some embodiments, there may exist more than one lateral arcuate shape located along and perpendicular to longitudinal line 152. There may also exist lateral arcuate shapes located rearward of the lateral center line 150. In one embodiment, the ATV may have a longitudinal arcuate shape with an apex located at lateral center line 150 and longitudinal center line 152 and a lateral arcuate shape 142 with an apex located at the lateral center line 150 and longitudinal center line 152. The lateral arcuate shape 142 may have an apex anywhere between lateral arcuate shape first end 144 and lateral arcuate shape second end 146. In other embodiments a lateral arcuate shape may exist continuously along a longitudinal length of the frame 105.

Figure 2:
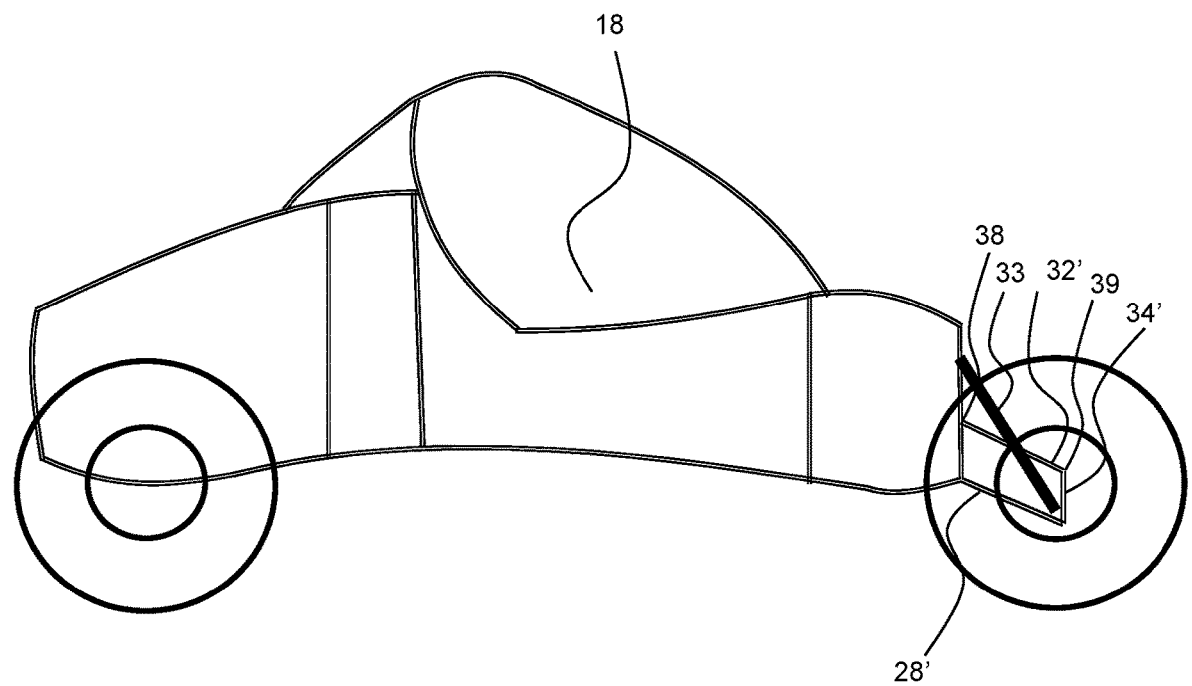
FIG. 2 is a side view of an ATV arcuate structural frame.

In various embodiments, as shown in FIG. 2, front A-Arms may be attached to a front portion of passenger support section 18. Rear bottom A-Arm 28' is shown attached to front portion of passenger support section 18. Front bottom A-Arm 28 (not shown in FIG. 2) may also be attached to front portion of passenger support section 18. As shown in FIG. 2, the rear top A-Arm 32' may be attached to a tower 34' above rear bottom A-Arms 28' respectively. Front bottom A-Arms may have an arcuate shape (not shown in FIG. 2) such that additional ground clearance is achieved. A shock 33 is shown attached to a front portion of passenger support section and attached below a line connecting front and rear wheel axis.

In various embodiments, as shown by example in FIG. 3, a frame 105 may be configured to receive trailing arms and front A-Arms for attaching front wheels and rear wheels. The front top A-Arms 30,32 may have an arch or curve to provide clearance around a front shock 33,35. The front bottom A-Arms 26,28 may attach at or near same place as front top A-Arms 30,32 to the frame 105. The front bottom A-Arms 26,28 and rearward bottom A-Arms 26',28' may be straight when viewed from a top plan view as shown in FIG. 3. The front bottom A-Arms 26,28 and rearward bottom A-Arms 26',28' may have a curve when viewed from a front view as shown in FIG. 1. The front bottom A-Arms 26,28 and rearward bottom A-Arms 26',28' and the trailing arms 23,24 were attached (in one example) to the structural frame at approximately 10 degrees to approximately follow the arcuate shape 28. The arcuate shape in one example had a radius of approximately 9 feet.

Figure 4:
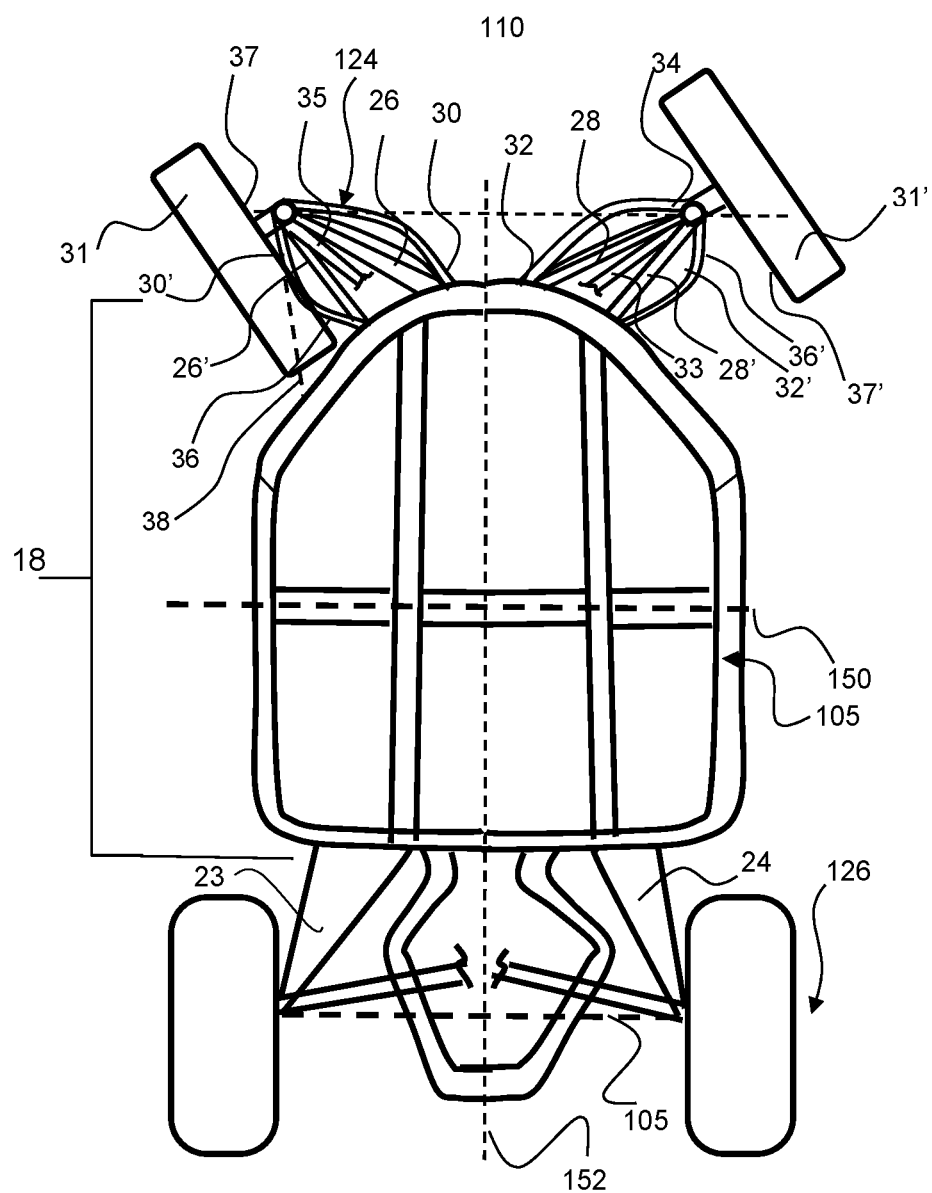

In one embodiment, as shown in FIG. 3, the front top A-Arm(s) 30, 32 have at least one curve or arcuate shape along a most forward facing portion or edge 34 such that the curve has an apex towards a front or forward direction of the ATV. At least one of the curves in the most forward facing portion or edge of top A-Arms is to provide clearance around the shock 33,35. The rearward most facing portion or edge 36,36' of the rearward top A-Arms 30',32' may have a curve or arcuate shape facing rearward such that the curve provides clearance around shocks 33,35 and may also provide clearance for the tires 31,31' when the rearward portion of the wheel (as shown with tire 31 in FIG. 4) is turned in towards the center of the ATV. If the top A-Arms did not have an arch, the top A-Arm would contact the shock. If the top A-arms did not have a curve or arcuate shape, the top A-Arms 30, 30' and 32, 32' may be more inline from a top view perspective with the bottom A-Arms 26, 26' and 28, 28'. Also, if the edges 36,36' did not have an arcuate shape that continued from apex of arcuate shape around the shock 33,35, the rearward top A-Arms 30', 32' would contact the frame 105 closer to lateral line 150 as compared to closer to top as front A-arms 30,32. If top rearward A-arms 30', 32' did not arch back towards the frame 105, the wheel would not be able to turn as sharp, as indicated by line 38. The line 38 represents an A-Arm without an arcuate shape. Therefore, one of ordinary skill in the art can realize advantages of an arcuate A-Arm, for example in combination with a shock 33,35 that is attached below a line connecting front wheel axis, the wheel would then contact that top rear A-Arms 30', 32'. In some cases, when the wheel 31 is turned such that rearward portion of the wheel 31 is closer to the frame than in a straight configuration, the rearward top A-Arms 30', 32' partially are inset to an inside edge 37,37' of the tire 31. For example, the apex of curve of the top A-Arm 30' are inset to tire edge 37, as shown in FIG. 4.

The frame can be constructed in various ways, for example, U.S. Pat. No. 9,493,191 and U.S. application Ser. No. 15/386,837 are incorporated by reference, and describe how an ATV frame can be made and useful with A-Arm(s) described herein.

The A-Arms can be made into an arcuate shape by any means known in the art. For example, the A-Arms can be made from a tubular rod of ¾" diameter and shaped by bending over a mandrel. The front and rear A-Arms can be made individually or made from a plate and inner portions hallowed out.

It is to be understood that the above reference arrangement are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An All-Terrain Vehicle (ATV) comprising;
a frame;
a shock;
a spindle;
a first rearward top A-Arm;
a first bottom A-Arm;
wherein the first rearward top A-Arm has an apex when viewed from a top view;
wherein the first rearward top A-Arm has a first end and a second end and arches around the shock and connects to a portion on the spindle with the first end of the first rearward top A-Arm, wherein the first rearward top A-Arm also arches towards the frame at the first rearward top A-Arm apex and connects to the frame at the second end of the first rearward top A-Arm;
wherein the first rearward top A-Arm is substantially straight when viewed from a front view; and
wherein the first bottom A-Arm arches upwards when viewed from a front view and is substantially straight when viewed from a top view.

2. The ATV of claim 1 wherein the shock attaches to the spindle below a centerline through a front wheel.

3. The ATV of claim 1 further comprising a second top A-Arm wherein the second top A-Arm has an arcuate shape and the second top A-Arm attaches to the spindle on a first end of the second top A-Arm and to the frame at a second end of the second top A-Arm and wherein the first top a-arm arcuate shape provides clearance for a front wheel when rearward portion of the front wheel is turned towards center of vehicle.

* * * * *